(12) United States Patent
Liu et al.

(10) Patent No.: US 11,321,966 B2
(45) Date of Patent: May 3, 2022

(54) METHOD AND APPARATUS FOR HUMAN BEHAVIOR RECOGNITION, AND STORAGE MEDIUM

(71) Applicant: BAIDU ONLINE NETWORK TECHNOLOGY (BEIJING) CO., LTD., Beijing (CN)

(72) Inventors: Xiao Liu, Beijing (CN); Xin Li, Beijing (CN); Fan Yang, Beijing (CN); Xubin Li, Beijing (CN); Hao Sun, Beijing (CN); Shilei Wen, Beijing (CN); Errui Ding, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 362 days.

(21) Appl. No.: 16/459,749

(22) Filed: Jul. 2, 2019

(65) Prior Publication Data

US 2019/0325205 A1 Oct. 24, 2019

(30) Foreign Application Priority Data

Jul. 3, 2018 (CN) .......................... 201810719392.5

(51) Int. Cl.
*G06V 40/20* (2022.01)
*G06T 7/292* (2017.01)
(Continued)

(52) U.S. Cl.
CPC .......... *G06V 40/20* (2022.01); *G06K 9/6256* (2013.01); *G06T 7/292* (2017.01); *G06V 20/52* (2022.01);
(Continued)

(58) Field of Classification Search
CPC .......... G06K 9/00335; G06K 9/00771; G06K 9/6256; G06K 9/6292; G06K 9/6277;
(Continued)

(56) References Cited

U.S. PATENT DOCUMENTS 9,740,977 B1 * 8/2017 Moon ................... G06V 20/52
10,529,077 B2 * 1/2020 Mehrseresht .......... G06N 3/084
(Continued)

FOREIGN PATENT DOCUMENTS

CN 107516317 A 12/2017

OTHER PUBLICATIONS

Jacob Westerberg: "A deep learning approach for action classification in American football video sequences", Student Thesis, Uppsala Universitet, Nov. 2017, pp. 1-44.
(Continued)

*Primary Examiner* — Michael S Osinski
(74) *Attorney, Agent, or Firm* — Dilworth IP, LLC

(57) ABSTRACT

A method and an apparatus for human behavior recognition, and a storage medium, the method includes: obtaining a human behavior video captured by a camera; extracting a start point and an end point of a human motion from the human behavior video, where the human motion between the start point and the end point corresponds to a sliding window; determining whether the sliding window is a motion section; and if the sliding window is a motion section, anticipating a motion category of the motion section using a pre-trained motion classifying model. Thus, accurate anticipation of a motion in a human behavior video captured by a camera is realized without human intervention.

11 Claims, 5 Drawing Sheets

(51) Int. Cl.
*G06K 9/62* (2022.01)
*G06V 20/52* (2022.01)

(52) U.S. Cl.
CPC .............. *G06T 2207/20081* (2013.01); *G06T 2207/20084* (2013.01); *G06T 2207/30196* (2013.01)

(58) Field of Classification Search
CPC ............... G06K 9/6268; G06T 7/292; G06T 2207/20081; G06T 2207/20084; G06T 2207/30196; G06V 40/20; G06V 20/52; G06V 20/40; G06V 20/44; G06F 3/012; G06F 3/013; G06F 3/017; G06F 3/011; G08B 13/19608
USPC .......................................................... 382/103
See application file for complete search history.

(56) References Cited

U.S. PATENT DOCUMENTS

| | | | | |
|---|---|---|---|---|
| 10,614,688 | B1* | 4/2020 | Pachikov | ............... G08B 31/00 |
| 2007/0196007 | A1* | 8/2007 | Chen | ...................... A61B 6/00 382/131 |
| 2009/0324010 | A1* | 12/2009 | Hou | ....................... G06V 20/52 382/103 |
| 2013/0135315 | A1* | 5/2013 | Bares | ................... G11B 27/031 345/473 |
| 2013/0155229 | A1* | 6/2013 | Thornton | ................. H04N 7/18 348/143 |
| 2014/0112546 | A1* | 4/2014 | Lee | ................. G08B 13/19676 382/107 |
| 2015/0228118 | A1* | 8/2015 | Eade | ....................... G06F 3/012 345/633 |
| 2015/0269427 | A1* | 9/2015 | Kim | ....................... H04N 7/181 348/159 |
| 2016/0364549 | A1* | 12/2016 | Wei | ....................... G16H 10/60 |
| 2017/0255832 | A1* | 9/2017 | Jones | .................. G06N 3/0454 |
| 2017/0278289 | A1* | 9/2017 | Marino | .............. G06Q 30/0276 |
| 2019/0114487 | A1* | 4/2019 | Vijayanarasimhan | ....................... G06K 9/00751 |
| 2019/0346931 | A1* | 11/2019 | Wu | ......................... G06F 3/017 |
| 2021/0248760 | A1* | 8/2021 | Jiang | ...................... G06F 3/038 |

OTHER PUBLICATIONS

Jana Machajdik et al., "Fusion of Data from Multiple Cameras for Fall Detection", Proceedings of the 5th BMI, Workshop on Behavior Monitoring and Interpretation, 2010. , pp. 1-7.

Shou Zheng et al., "Temporal Action Localization in Untrimmed Videos via Multi-Stage CNNs", 2016 IEEE Conference on Computer Vision and Pattern Recognition (CVPR), IEEE, Jun. 27, 2016 (Jun. 27, 2016), pp. 1049-1058.

Extended European Search Report, Application No. 19183931.5, dated Nov. 27, 2019, 8 pages.

Office Action dated Mar. 23, 2020 in Corresponding Chinese Application No. 201810719392.5, 9 pages.

Zan Gao et al., "Multi-Camera Recognition of People Operating Home Medical Devices" 2010 3rd International Conference on Biomedical Engineering and Informatics (BMEI) IEEE, Oct. 16, 2010, pp. 2481-1485.

Examination Report issued in European Patent Application 19 183 931.5, dated Oct. 12, 2020, 5 pages.

* cited by examiner

METHOD AND APPARATUS FOR HUMAN BEHAVIOR RECOGNITION, AND STORAGE MEDIUM

CROSS-REFERENCE TO RELATED APPLICATIONS

This application claims priority to Chinese Application No. CN 201810719392.5, filed on Jul. 3, 2018, which is hereby incorporated by reference in its entirety.

FIELD

The present disclosure relates to the field of image recognition technologies and, in particular, to a method and an apparatus for human behavior recognition, and a storage medium.

BACKGROUND

With the development and popularization of video surveillance technologies, video recording and photography are used in more and more occasions to obtain evidence on spot, so that events become traceable, but still, not preventable in time.

Aiming at such a drawback, engineers have proposed to anticipate a human behavior by recognizing the human behavior in an image according to what has been captured by a single camera.

However, a single camera tends to have a blind angle, which makes it difficult to capture the whole process of the human behavior, leading to inaccuracy in the result of anticipation.

SUMMARY

Embodiments of the present disclosure provide a method and an apparatus for human behavior recognition, and a storage medium, which are used to anticipate, without human intervention, a motion in a human behavior video captured by a camera with accuracy.

According to a first aspect, the present disclosure provides a method for human behavior recognition, including:

obtaining a human behavior video captured by a camera;

extracting a start point and an end point of a human motion from the human behavior video, wherein the human motion between the start point and the end point corresponds to a sliding window;

determining whether the sliding window is a motion section; and if the sliding window is a motion section, anticipating a motion category of the motion section using a pre-trained motion classifying model.

In a possible design, where the obtaining a human behavior video captured by a camera includes:

obtaining human behavior videos captured by two or more cameras during a same time span and including a same target person.

In a possible design, where the extracting a start point and an end point of a human motion from the human behavior video includes:

from the human behavior videos captured by different cameras during the same time span and including the same target person, enumerating start points and end points of human motions along a timeline using a sliding window method to obtain sliding windows corresponding to the different cameras.

In a possible design, where the determining whether the sliding window is a motion section includes:

determining whether the sliding window is a motion section using a pre-trained behavior time span discriminating model.

In a possible design, where before the determining whether the sliding window is a motion section using a pre-trained behavior time span discriminating model, the method further includes:

in the human behavior video captured by the camera, randomly enumerating start points and end points of human motions using a sliding window method;

constructing a first training sample data set out of a set of sliding windows corresponding to different start points and end points; dividing the sliding windows in the first training sample data set into positive samples and negative samples manually, wherein a positive sample is a sample whose overlap ratio with an actual time span of a motion is above a pre-set threshold, and a negative sample is a sample whose overlap ratio with an actual time span of a motion is less than the pre-set threshold;

building a behavior time span discriminating model based on a neural network;

iteratively training the behavior time span discriminating model with the positive samples and the negative samples to obtain a probability that a sliding window, which is anticipated by the behavior time span discriminating model, is a motion section; and calculating a cross-entropy error between the probability that the sliding window is anticipated as the motion section and an actual classification; obtaining a gradient of the behavior time span discriminating model based on the cross-entropy error; updating a parameter of the behavior time span discriminating model using a stochastic gradient descent method until a maximum number of iterations is reached to obtain a pre-trained behavior time span discriminating model.

In a possible design, before the anticipating a motion category of the motion section using a pre-trained motion classifying model, the method further includes:

in a human behavior video captured by a camera, determining a start point and an end point of a human motion, clipping out a motion section between the start point and the end point; annotating a motion category corresponding to the motion section; and constructing a second training sample data set out of a set of motion sections whose motion categories have been annotated;

building a motion classifying model based on a neural network;

iteratively training the motion classifying model with the second training sample data set to obtain a motion category probability anticipated by the motion classifying model; and calculating a cross-entropy error between the anticipated motion category probability and the annotated motion category; obtaining a gradient of the motion classifying model based on the cross-entropy error; updating a parameter of the motion classifying model using a stochastic gradient descent method until a maximum number of iterations is reached to obtain the pre-trained motion classifying model.

In a possible design, where the anticipating a motion category of the motion section using a pre-trained motion classifying model includes:

anticipating, using the pre-trained motion classifying model, probabilities that individual motion sections for each camera match a motion category, respectively, wherein the motion sections are captured by different cameras for a same target during a same time span;

obtaining an average of probabilities for a same motion category in different cameras; and selecting a motion category with a maximum average probability as a resulting anticipation.

According to a second aspect, the present disclosure provides an apparatus for human behavior recognition, including:

an obtaining module, configured to obtain a human behavior video captured by a camera;

an extracting module, configured to extract a start point and an end point of a human motion from the human behavior video, wherein the human motion between the start point and the end point corresponds to a sliding window;

a determining module, configured to determine whether the sliding window is a motion section; and an anticipating module, configured to anticipate a motion category of the motion section using a pre-trained motion classifying model if the sliding window is a motion section.

In a possible design, the obtaining module is specifically configured to:

obtain human behavior videos captured by two or more cameras during a same time span and including a same target person.

In a possible design, the extracting module is specifically configured to:

from the human behavior videos captured by different cameras during the same time span and including the same target person, enumerate start points and end points of human motions along a timeline using a sliding window method to obtain sliding windows corresponding to the different cameras.

In a possible design, the determining module is configured to:

determine whether the sliding window is a motion section using a pre-trained behavior time span discriminating model.

In a possible design, it further includes:

a first training module, configured to, before whether the sliding window is a motion section is determined using a pre-trained behavior time span discriminating model, randomly enumerate start points and end points of human motions using a sliding window method in the human behavior video captured by the camera;

construct a first training sample data set out of a set of sliding windows corresponding to different start points and end points; dividing the sliding windows in the first training sample data set into positive samples and negative samples manually, wherein a positive sample is a sample whose overlap ratio with an actual time span of a motion is above a pre-set threshold, and a negative sample is a sample whose overlap ratio with an actual time span of a motion is less than the pre-set threshold;

build a behavior time span discriminating model based on a neural network;

iteratively train the behavior time span discriminating model with the positive samples and the negative samples to obtain a probability that a sliding window, which is anticipated by the behavior time span discriminating model, is a motion section; and calculate a cross-entropy error between the probability that the sliding window is anticipated as the motion section and an actual classification; obtain a gradient of the behavior time span discriminating model based on the cross-entropy error; update a parameter of the behavior time span discriminating model using a stochastic gradient descent method until a maximum number of iterations is reached to obtain a pre-trained behavior time span discriminating model.

In a possible design, it further includes:

a second training module, configured to, before a motion category of the motion section is anticipated using a pre-trained motion classifying model, determine a start point and an end point of a human motion in a human behavior video captured by a camera, clip out a motion section between the start point and the end point; annotate a motion category corresponding to the motion section; and construct a second training sample data set out of a set of motion sections whose motion categories have been annotated;

build a motion classifying model based on a neural network;

iteratively train the motion classifying model with the second training sample data set to obtain a motion category probability anticipated by the motion classifying model; and calculate a cross-entropy error between the anticipated motion category probability and the annotated motion category; obtain a gradient of the motion classifying model based on the cross-entropy error; update a parameter of the motion classifying model using a stochastic gradient descent method until a maximum number of iterations is reached to obtain the pre-trained motion classifying model.

In a possible design, the anticipating module is specifically configured to:

anticipate, using the pre-trained motion classifying model, probabilities that individual motion sections for each camera match a motion category, respectively, wherein the motion sections are captured by different cameras for a same target during a same time span;

obtain an average of probabilities for a same motion category in different cameras; and select a motion category with a maximum average probability as a resulting anticipation.

According to a third aspect, the present disclosure provides a server, including: a memory and a processor, the memory storing thereon instructions executable by the processor, where the processor is configured to execute the instructions to perform the method for human behavior recognition according to any one of the embodiments of the first aspect.

According to a fourth aspect, the present disclosure provides a computer-readable storage medium, storing thereon a computer program which, when being executed by a processor, implements the method for human behavior recognition according to any one of the embodiments of the first aspect.

According to a fifth aspect, the present disclosure provides a computer program product, including a computer program stored in a computer readable storage medium, where at least one processor of the server is capable of reading from the computer readable storage medium, and executes, the computer program to implement the method for human behavior recognition according to any one of the embodiments of the first aspect.

According to the method, apparatus and storage medium for human behavior recognition, a human behavior video captured by a camera is obtained; a start point and an end point of a human motion are extracted from the human behavior video, where the human motion between the start point and the end point corresponds to a sliding window; whether the sliding window is a motion section is determined; and if the sliding window is a motion section, a motion category of the motion section is anticipated using a pre-trained motion classifying model. Thus, accurate anticipation of a motion in a human behavior video captured by a camera is realized without human intervention.

BRIEF DESCRIPTION OF DRAWINGS

To describe the technical solutions in embodiments of the present disclosure or in the prior art more clearly, the following briefly introduces the accompanying drawings needed for describing the embodiments or the prior art. Apparently, the accompanying drawing in the following description illustrate merely some embodiments of the present disclosure, and those ordinarily skilled in the art may still derive other drawings from these accompanying drawings without creative effort.

DETAILED DESCRIPTION

In order to make objectives, technical solutions and advantages of the embodiments of the present disclosure clearer, the technical solution of the embodiments of the present disclosure will be described in detail below, in conjunction with accompanying drawings. Apparently, the described embodiments are part rather than all of the embodiments of the present disclosure. Based on the embodiments of the present disclosure, all the other embodiments obtained by those of ordinary skill in the art without any creative work are within the protection scope of the present disclosure.

The terms "first", "second", "third" and the like (if any) in the description, claims and drawings are used for distinguishing between similar elements, and are not necessarily for describing a sequential or chronological order. It should be understood that the terms so used are interchangeable under appropriate circumstances, so that the embodiments of the disclosure described herein are capable of operating in sequences other than those described or illustrated herein. Besides, the terms "comprise", "have" and any variant thereof are intended to mean exclusively including, for example, a process, method, system, product or equipment that "comprises" a series of steps or units need not be limited to those steps or units which have been expressly listed, but may include other steps or units that are not expressly listed or otherwise inherent to such process, method, product or equipment.

Now, the technical solution provided in the present disclosure will be described in detail with specific embodiments. The following embodiments could be recombined with each other, the same or similar concepts or processes may not be repeated in some embodiments.

Figure 1:
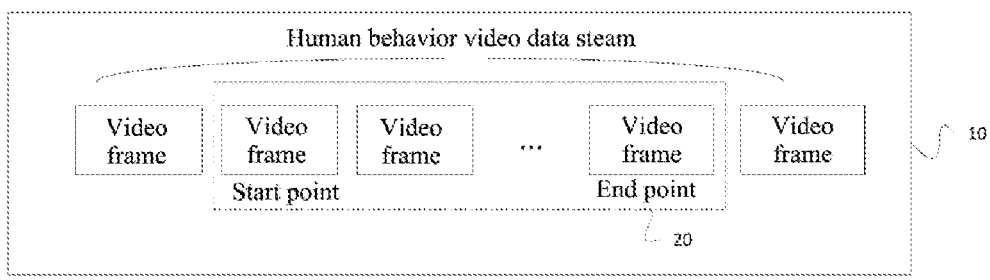
FIG. 1 is a schematic structural diagram of a human behavior video data steam captured by a camera according to the present disclosure.

FIG. 1 is a schematic structural diagram of a human behavior video data steam 10 captured by a camera according to the present disclosure. As shown in FIG. 1, a start point and an end point of a human motion are extracted out of human behavior video data steam 10 captured by a camera, namely, the video frame where the motion begins and the video frame where the motion ends are identified. Specifically, using a sliding window 20, start points and end points of human motions in the human behavior video data steam 10 may be enumerated, thus obtaining a sliding window 20 corresponding to the camera. Then, determining whether the sliding window is a motion section. If the sliding window is indeed a motion section, anticipating the motion category of the motion section using a pre-trained motion classifying model. The method in this embodiment requires no human intervention throughout the process, extracts motion sections from the human behavior video efficiently, and anticipates the motion category of the motion sections with high efficiency and accuracy. The method can be carried out with multiple cameras, so as to be adapted to human behavior recognition in complicated scenarios.

Now, the technical solution provided in the embodiments of the present disclosure will be described in detail with specific embodiments. The following embodiments could be recombined with each other, and the same or similar concepts or processes may not be repeated in some embodiments. Embodiments of the disclosure will be described in conjunction with the accompanying drawings.

Figure 2:
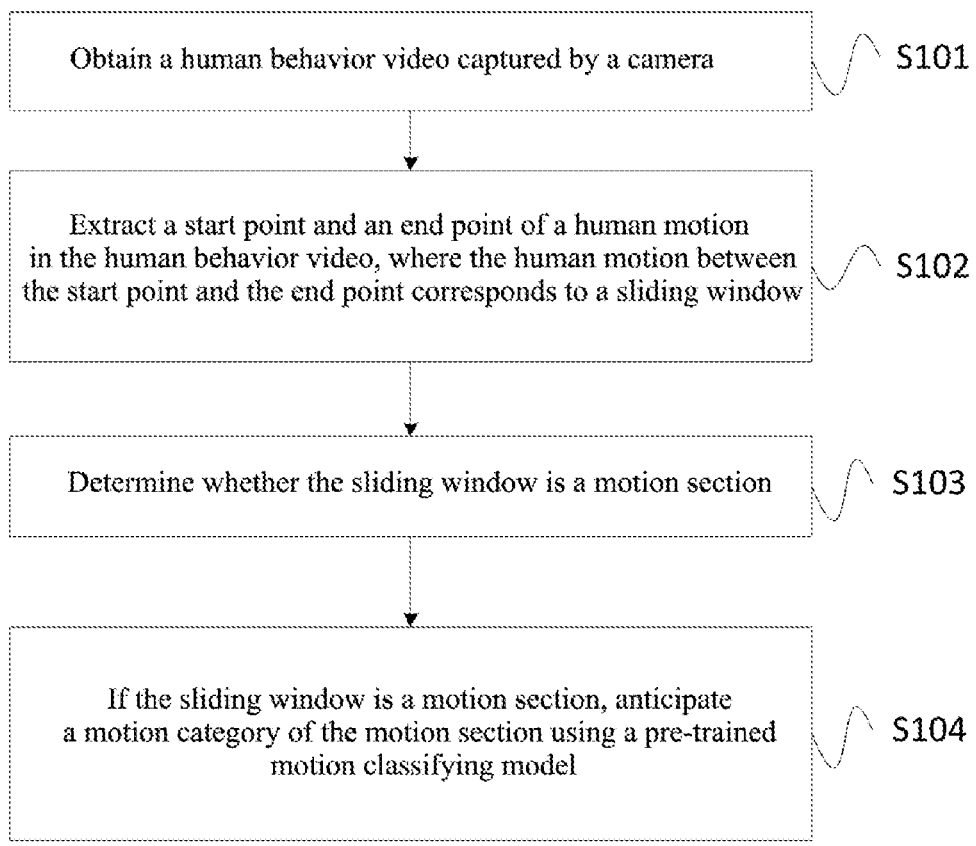
FIG. 2 is a schematic flowchart of a method for human behavior recognition according to a first embodiment of the present disclosure.

FIG. 2 is a schematic flowchart of a method for human behavior recognition according to a first embodiment of the present disclosure. As shown in FIG. 2, the method illustrated in the embodiment includes:

S101: obtain a human behavior video captured by a camera.

In an alternative embodiment, human behavior videos, which have been captured by two or more cameras during the same time span and include images of the same target person, may be obtained. By tracking the same target person using multiple cameras from multiple angles of view, the existence of a blind angle may be prevented, thus improving the tracking accuracy. As it should be, obtaining a human behavior video captured by only one camera is also allowable. The angle and number of cameras is not particularly limited in this embodiment.

S102: extract a start point and an end point of a human motion in the human behavior video, where the human motion between the start point and the end point corresponds to a sliding window.

This embodiment has been exemplified using two or more cameras, so that from human behavior videos of the same target person captured during the same time span by different cameras, start points and end points of human motions may be enumerated along the timeline using a sliding window method to obtain sliding windows corresponding to the different cameras. A similar method may be applied in capturing from one camera using a sliding window.

S103: determine whether the sliding window is a motion section.

In an alternative embodiment, a pre-trained behavior time span discriminating model may be used in determining whether the sliding window is a motion section.

Specifically, the process of building and training the behavior time span discriminating model is explained as follows:

In a human behavior video captured by a camera, start points and end points of human motions are enumerated randomly using a sliding window method. A first training sample data set, which includes a set of sliding windows corresponding to different start points and end points, is constructed. The sliding windows in the first training sample data set are divided into positive samples and negative samples manually, where a positive sample is a sample whose overlap ratio with an actual time span of a motion is above a pre-set threshold, and a negative sample is a sample whose overlap ratio with an actual time span of a motion is less than the pre-set threshold. The behavior time span discriminating model is built based on a neural network. The behavior time span discriminating model is trained iteratively with the positive samples and the negative samples to obtain a probability that a sliding window, which is anticipated by the behavior time span discriminating model, is a motion section. A cross-entropy error between the probability that the sliding window is anticipated as the motion section and an actual classification is calculated to obtain a gradient of the behavior time span discriminating model based on the cross-entropy error. A parameter of the behavior time span discriminating model is updated using a stochastic gradient descent method until a maximum number of iterations is reached to obtain a pre-trained behavior time span discriminating model.

S104: if the sliding window is a motion section, anticipate a motion category of the motion section using a pre-trained motion classifying model.

In an alternative embodiment, the motion classifying model is built and trained by the following:

in a human behavior video captured by a camera, determining a start point and an end point of a human motion, clipping out a motion section between the start point and the end point; annotating a motion category corresponding to the motion section; and constructing a second training sample data set out of a set of motion sections whose motion categories have been annotated; building a motion classifying model based on a neural network; iteratively training the motion classifying model with the second training sample data set to obtain a motion category probability anticipated by the motion classifying model; and calculating a cross-entropy error between the anticipated motion category probability and the annotated motion category; obtaining a gradient of the motion classifying model based on the cross-entropy error; updating a parameter of the motion classifying model using a stochastic gradient descent method until a maximum number of iterations is reached to obtain the pre-trained motion classifying model.

In this embodiment, probabilities that individual motion sections for each camera match a motion category may be anticipated respectively using a pre-trained motion classifying model, where the motion sections are captured by different cameras for the same target during the same time span; an average of probabilities for the same motion category in different cameras is obtained; and the motion category with the maximum average probability is selected as a resulting anticipation. Specifically, taking a retail supermarket as an example. Three motion categories may be pre-set, including: reaching for an item, putting an item into a shopping cart, and unpacking an item. Assuming that customer A is the target, whose behavior videos are captured by three cameras during the same time span, where the classification probabilities of a motion section according to the first camera is: 15% reaching for an item, 80% putting an item into a shopping cart and 5% unpacking an item; the classification probabilities of the motion section according to the second camera is: 25% reaching for an item, 70% putting an item into a shopping cart and 5% unpacking an item; and the classification probabilities of the motion section according to the third camera is: 35% reaching for an item, 60% putting an item into a shopping cart and 5% unpacking an item. The average values of probabilities for the three motion categories according to the three cameras are: 25% reaching for an item, 70% putting an item into a shopping cart and 5% unpacking an item. Since the putting an item into a shopping cart corresponds to the maximum average probability, it is thus selected to be the resulting anticipation for the motion section of customer A.

According to this embodiment, human behavior video is obtained by a camera, from which a start point and an end point of a human motion are extracted, where the human motion between the start point and the end point corresponds to a sliding window. Whether the sliding window is a motion section is determined. If the sliding window is a motion section, the motion category of the motion section is anticipated using a pre-trained motion classifying model. Thus, without human intervention, the motion in the human behavior video captured by a camera has been anticipated with accuracy.

Figure 3:
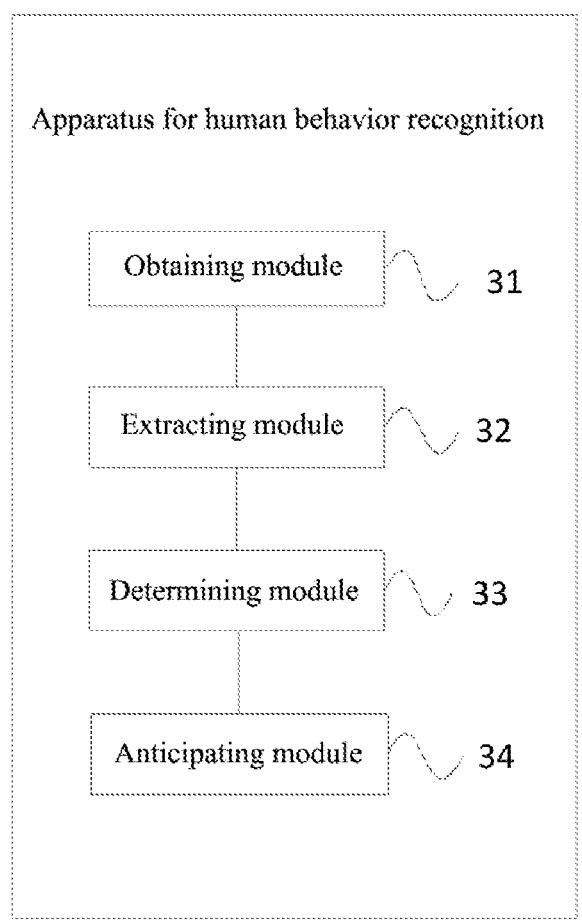
FIG. 3 is a schematic structural diagram of an apparatus for human behavior recognition according to a second embodiment of the present disclosure.

FIG. 3 is a schematic structural diagram of an apparatus for human behavior recognition according to a second embodiment of the present disclosure. As shown in FIG. 3, the apparatus for human behavior recognition illustrated in the embodiment includes:

an obtaining module 31, configured to obtain a human behavior video captured by a camera;

an extracting module 32, configured to extract a start point and an end point of a human motion from the human behavior video, wherein the human motion between the start point and the end point corresponds to a sliding window;

a determining module 33, configured to determine whether the sliding window is a motion section; and an anticipating module 34, configured to anticipate a motion category of the motion section using a pre-trained motion classifying model if the sliding window is a motion section.

In a possible design, the obtaining module 31 is specifically configured to:

obtain human behavior videos captured by two or more cameras during a same time span and including a same target person.

In a possible design, the extracting module is specifically configured to:

from the human behavior videos captured by different cameras during the same time span and including the same target person, enumerate start points and end points of human motions along a timeline using a sliding window method to obtain sliding windows corresponding to the different cameras.

In a possible design, the determining module 33 is specifically configured to:

determine whether the sliding window is a motion section using a pre-trained behavior time span discriminating model.

In a possible design, the anticipating module 34 is specifically configured to:

anticipate, using the pre-trained motion classifying model, probabilities that individual motion sections for each camera match a motion category, respectively, wherein the motion sections are captured by different cameras for a same target during a same time span;

obtain an average of probabilities for a same motion category in different cameras; and select a motion category with a maximum average probability as a resulting anticipation.

The apparatus for human behavior recognition illustrated in the embodiment may be used to implement the technical solution in any one of the above-described method embodiments, where the implementation principle and technical advantage are similar and will not be detailed herein again.

Figure 4:
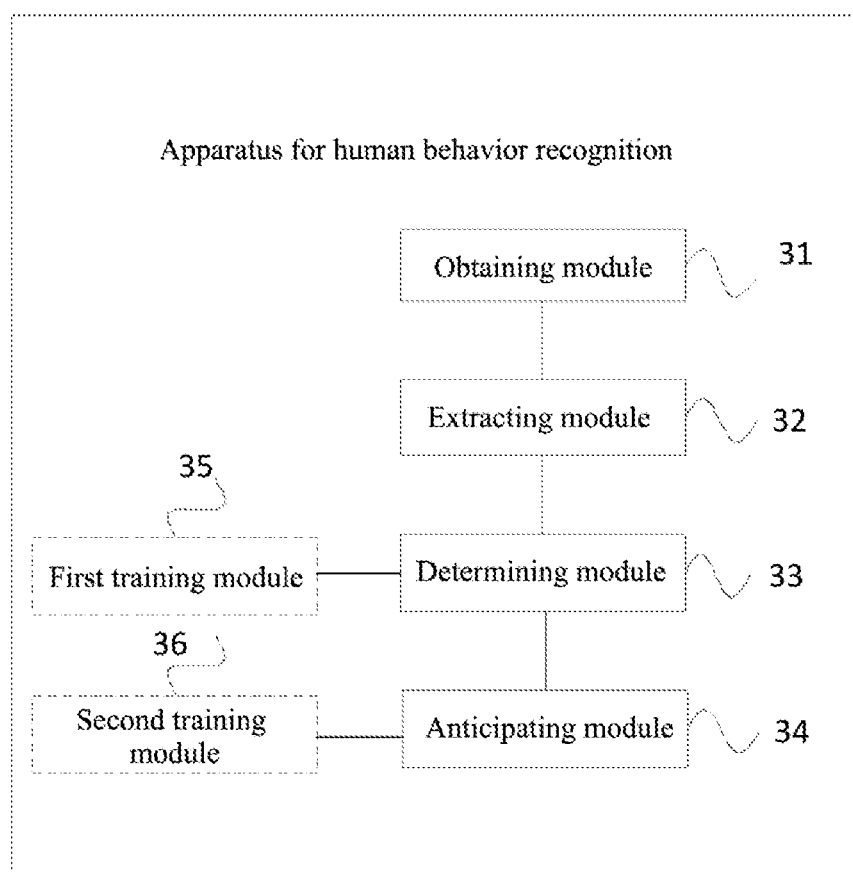
FIG. 4 is a schematic structural diagram of an apparatus for human behavior recognition according to a third embodiment of the present disclosure.

FIG. 4 is a schematic structural diagram of an apparatus for human behavior recognition according to a third embodiment of the present disclosure. As shown in FIG. 4, based on the embodiment shown in FIG. 3, the apparatus for human behavior recognition may further include:

a first training module 35, configured to, before whether the sliding window is a motion section is determined using a pre-trained behavior time span discriminating model, randomly enumerate start points and end points of human motions using a sliding window method in the human behavior video captured by the camera;

construct a first training sample data set out of a set of sliding windows corresponding to different start points and end points; dividing the sliding windows in the first training sample data set into positive samples and negative samples manually, wherein a positive sample is a sample whose overlap ratio with an actual time span of a motion is above a pre-set threshold, and a negative sample is a sample whose overlap ratio with an actual time span of a motion is less than the pre-set threshold;

build a behavior time span discriminating model based on a neural network;

iteratively train the behavior time span discriminating model with the positive samples and the negative samples to obtain a probability that a sliding window, which is anticipated by the behavior time span discriminating model, is a motion section; and calculate a cross-entropy error between the probability that the sliding window is anticipated as the motion section and an actual classification; obtain a gradient of the behavior time span discriminating model based on the cross-entropy error; update a parameter of the behavior time span discriminating model using a stochastic gradient descent method until a maximum number of iterations is reached to obtain a pre-trained behavior time span discriminating model.

In a possible design, the apparatus further includes:

a second training module 36, configured to, before a motion category of the motion section is anticipated using a pre-trained motion classifying model, determine a start point and an end point of a human motion in a human behavior video captured by a camera, clip out a motion section between the start point and the end point; annotate a motion category corresponding to the motion section; and construct a second training sample data set out of a set of motion sections whose motion categories have been annotated;

build a motion classifying model based on a neural network;

iteratively train the motion classifying model with the second training sample data set to obtain a motion category probability anticipated by the motion classifying model; and calculate a cross-entropy error between the anticipated motion category probability and the annotated motion category; obtain a gradient of the motion classifying model based on the cross-entropy error; update a parameter of the motion classifying model using a stochastic gradient descent method until a maximum number of iterations is reached to obtain the pre-trained motion classifying model.

The apparatus for human behavior recognition illustrated in the embodiment may be used to implement the technical solution in any one of the above-described method embodiments, where the implementation principle and technical advantage are similar and will not be detailed herein again.

Figure 5:
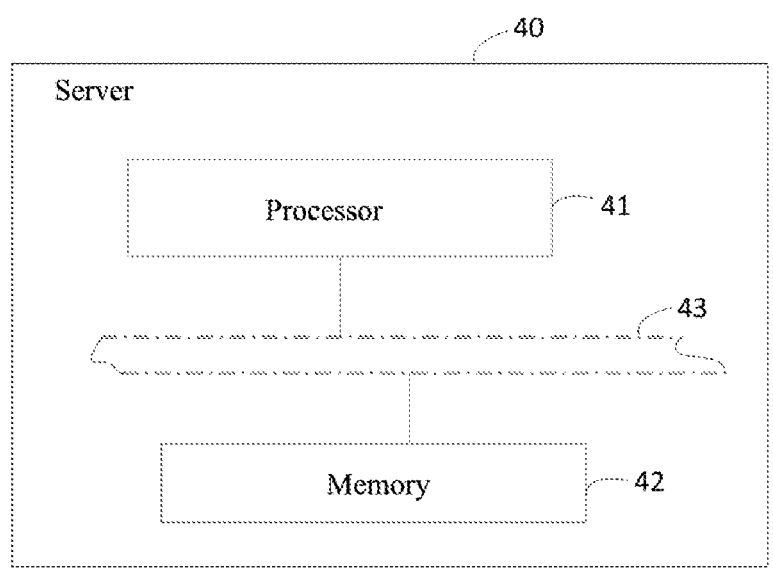
FIG. 5 is a schematic structural diagram of a server according to a fourth embodiment of the present disclosure.

FIG. 5 is a schematic structural diagram of a server according to a fourth embodiment of the present disclosure. As shown in FIG. 5, the server 40 illustrated in the embodiment includes: a processor 41 and a memory 42.

The memory 42 is configured to store thereon a computer program (e.g., an application, a functional module, etc., that implements the foregoing method for human behavior recognition), computer instructions, etc., where the computer program and/or the computer instructions may be stored in partitions of one or more memories 42. Moreover, the foregoing computer program, the computer instructions and data, etc., can be invoked by the processor 41.

The processor 41 is configured to execute the computer program stored in the memory 42 to perform the steps of the above-described methods in the embodiments. For the particulars, reference may be made to related descriptions of the method embodiments. The memory 42 and the processor 41 may be coupled via a bus 43.

The server illustrated in the embodiment may be used to implement the technical solution in any one of the above-described method embodiments, where the implementation principle and technical advantage are similar and will not be detailed herein again.

An embodiment of the present application also provides a computer-readable storage medium storing thereon computer executable instructions which, when executed by at least one processor of a user equipment, perform various possible methods described above.

The computer-readable medium may include a storage medium and a communication medium, where the communication medium includes any medium that facilitates transfer of a computer program from one place to another. The storage medium may be any available medium that can be accessed by a general purpose or special purpose computer. An exemplary storage medium is coupled to a processor such that the processor can read information from, and write information into, the storage medium. As it should be, the storage medium may be part of the processor. The processor and the storage medium may reside in an ASIC (Application Specific Integrated Circuit). Additionally, the ASIC may reside in a user equipment. Of course, the processor and the storage medium may also exist as standalone components in a communication device.

It can be understood by those ordinarily skilled in the art that all or some of the steps of the method in the above embodiments can be realized by a program instructing a related hardware, where the program may be stored in a computer readable storage medium. If being executed, the program executes steps including the foregoing method embodiments. The storage medium may include any medium that can store program codes, such as a ROM (Read Only Memory), RAM (Random Access Memory), magnetic disk storage or optical disk storage.

Finally, it should be noted that the above embodiments are only used to explain the technical solution of the present disclosure and shall not be construed as limitation. Although the disclosure has been described in considerable detail with reference to the foregoing embodiments, those ordinarily skilled in the art should understand that modifications can be made to the technical solution of the present disclosure, or some or all technical features thereof may be substituted by their equivalents, and such modifications or substitution do not cause the nature of the technical solution to deviate from the scope of the technical solution of the embodiments according to the present disclosure.

What is claimed is:

1. A method for human behavior recognition, comprising:
obtaining human behavior videos captured by two or more cameras during a same time span and comprising a same target person;

extracting a start point and an end point of a human motion from the human behavior video, wherein the human motion between the start point and the end point corresponds to a sliding window;

determining whether the sliding window is a motion section; and if the sliding window is a motion section, anticipating, using a pre-trained motion classifying model, probabilities that individual motion sections for each camera match a motion category, respectively, wherein the motion sections are captured by different cameras for a same target during the same time span; obtaining an average of probabilities for a same motion category in different cameras; and selecting a motion category with a maximum average probability as a resulting anticipation.

2. The method according to claim 1, wherein the extracting of a start point and an end point of a human motion from the human behavior video comprises:

from the human behavior videos captured by different cameras during the same time span and including the same target person, enumerating start points and end points of human motions along a timeline using a sliding window method to obtain sliding windows corresponding to the different cameras.

3. The method according to claim 1, wherein the determining of whether the sliding window is a motion section comprises:

determining whether the sliding window is a motion section using a pre-trained behavior time span discriminating model.

4. The method according to claim 3, wherein, before the determining of whether the sliding window is a motion section using a pre-trained behavior time span discriminating model, the method further comprises:

in the human behavior video captured by the camera, randomly enumerating start points and end points of human motions using a sliding window method;

constructing a first training sample data set out of a set of sliding windows corresponding to different start points and end points; dividing the sliding windows in the first training sample data set into positive samples and negative samples manually, wherein a positive sample is a sample whose overlap ratio with an actual time span of a motion is above a pre-set threshold, and a negative sample is a sample whose overlap ratio with an actual time span of a motion is less than the pre-set threshold;

building a behavior time span discriminating model based on a neural network;

iteratively training the behavior time span discriminating model with the positive samples and the negative samples to obtain a probability that a sliding window, which is anticipated by the behavior time span discriminating model, is a motion section; and calculating a cross-entropy error between the probability that the sliding window is anticipated as the motion section and an actual classification; obtaining a gradient of the behavior time span discriminating model based on the cross-entropy error; updating a parameter of the behavior time span discriminating model using a stochastic gradient descent method until a maximum number of iterations is reached to obtain a pre-trained behavior time span discriminating model.

5. The method according to claim 1, wherein, before the anticipating, using a pre-trained motion classifying model, probabilities that individual motion sections for each camera match a motion category, respectively, wherein the motion sections are captured by different cameras for a same target during the same time span, the method further comprises:

in a human behavior video captured by a camera, determining a start point and an end point of a human motion, clipping out a motion section between the start point and the end point; annotating a motion category corresponding to the motion section; and constructing a second training sample data set out of a set of motion sections whose motion categories have been annotated;

building a motion classifying model based on a neural network;

iteratively training the motion classifying model with the second training sample data set to obtain a motion category probability anticipated by the motion classifying model; and calculating a cross-entropy error between the anticipated motion category probability and the annotated motion category; obtaining a gradient of the motion classifying model based on the cross-entropy error; updating a parameter of the motion classifying model using a stochastic gradient descent method until a maximum number of iterations is reached to obtain the pre-trained motion classifying model.

6. An apparatus for human behavior recognition, comprising:

a memory and a processor coupled to the memory via a bus;

the memory storing thereon instructions executable by the processor, wherein the processor is configured to execute the instructions to:

obtain human behavior videos captured by two or more cameras during a same time span and including a same target person;

extract a start point and an end point of a human motion from the human behavior video, wherein the human motion between the start point and the end point corresponds to a sliding window;

determine whether the sliding window is a motion section; and if the sliding window is a motion section, anticipate, using a pre-trained motion classifying model, probabilities that individual motion sections for each camera match a motion category, respectively, wherein the motion sections are captured by different cameras for the same target during a same time span; obtain an average of probabilities for a same motion category in different cameras; and select a motion category with a maximum average probability as a resulting anticipation.

7. The apparatus according to claim 6, wherein the processor is configured to execute the instructions to:

from the human behavior videos captured by different cameras during the same time span and including the same target person, enumerate start points and end points of human motions along a timeline using a sliding window method to obtain sliding windows corresponding to the different cameras.

8. The apparatus according to claim 6, wherein the processor is configured to execute the instructions to:

determine whether the sliding window is a motion section using a pre-trained behavior time span discriminating model.

9. The apparatus according to claim 8, wherein the processor is further configured to execute the instructions to:

before determining whether the sliding window is a motion section using a pre-trained behavior time span discriminating model, randomly enumerate start points and end points of human motions using a sliding window method in the human behavior video captured by the camera;

construct a first training sample data set out of a set of sliding windows corresponding to different start points and end points; dividing the sliding windows in the first training sample data set into positive samples and negative samples manually, wherein a positive sample is a sample whose overlap ratio with an actual time span of a motion is above a pre-set threshold, and a negative sample is a sample whose overlap ratio with an actual time span of a motion is less than the pre-set threshold;

build a behavior time span discriminating model based on a neural network;

iteratively train the behavior time span discriminating model with the positive samples and the negative samples to obtain a probability that a sliding window, which is anticipated by the behavior time span discriminating model, is a motion section; and calculate a cross-entropy error between the probability that the sliding window is anticipated as the motion section and an actual classification; obtain a gradient of the behavior time span discriminating model based on the cross-entropy error; update a parameter of the behavior time span discriminating model using a stochastic gradient descent method until a maximum number of iterations is reached to obtain a pre-trained behavior time span discriminating model.

10. The apparatus according to claim 6, wherein the processor is further configured to execute the instructions to:

before a motion category of the motion section is anticipated using a pre-trained motion classifying model, determine a start point and an end point of a human motion in a human behavior video captured by a camera, clip out a motion section between the start point and the end point; annotate a motion category corresponding to the motion section; and construct a second training sample data set out of a set of motion sections whose motion categories have been annotated;

build a motion classifying model based on a neural network;

iteratively train the motion classifying model with the second training sample data set to obtain a motion category probability anticipated by the motion classifying model; and calculate a cross-entropy error between the anticipated motion category probability and the annotated motion category; obtain a gradient of the motion classifying model based on the cross-entropy error; update a parameter of the motion classifying model using a stochastic gradient descent method until a maximum number of iterations is reached to obtain the pre-trained motion classifying model.

11. A non-transitory computer-readable storage medium, storing thereon a computer program which, when being executed by a processor, implements the method for human behavior recognition according to claim 1.

* * * * *